US012562384B2

(12) United States Patent
Xie et al.

(10) Patent No.: US 12,562,384 B2
(45) Date of Patent: Feb. 24, 2026

(54) PREPARATION METHOD AND USE OF HIGH-PERFORMANCE MODIFIED LITHIUM-NICKEL- MANGANESE-COBALT OXIDE (LNMCO) NICKEL 55 MATERIAL

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Yinghao Xie, Guangdong (CN); Jianxiao Tang, Guangdong (CN); Xuemei Zhang, Guangdong (CN); Yannan Ou, Guangdong (CN); Banglai Ming, Guangdong (CN); Haijun Yu, Guangdong (CN); Changdong Li, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 330 days.

(21) Appl. No.: 18/234,876

(22) Filed: Aug. 16, 2023

(65) Prior Publication Data
US 2023/0395795 A1     Dec. 7, 2023

Related U.S. Application Data

(63) Continuation of application No. PCT/CN2022/095682, filed on May 27, 2022.

(30) Foreign Application Priority Data

Aug. 3, 2021     (CN) .......................... 202110886828.1

(51) Int. Cl.
H01B 1/08          (2006.01)
C01G 53/44         (2025.01)
(Continued)

(52) U.S. Cl.
CPC ............ H01M 4/525 (2013.01); C01G 53/44 (2013.01); H01B 1/08 (2013.01); H01M 4/505 (2013.01);
(Continued)

(58) Field of Classification Search
CPC ......... H01B 1/00; H01B 1/08; H01M 4/0471; H01M 4/0483; H01M 4/505; H01M 4/525; C01G 53/44; C01G 53/50
See application file for complete search history.

(56) References Cited

U.S. PATENT DOCUMENTS

| | | | |
|---|---|---|---|
| 8,080,335 B2 * | 12/2011 | Kawakami | ............ H01M 4/386 252/182.1 |
| 11,165,060 B2 * | 11/2021 | Sakai | ................ H01M 10/0525 |
| 2022/0149365 A1 * | 5/2022 | Inoue | .................... H01M 4/525 |

FOREIGN PATENT DOCUMENTS

| | | | |
|---|---|---|---|
| CN | 109860590 B | 6/2020 | |
| WO | WO-2023010972 A1 * | 2/2023 | ........ H01M 10/0525 |

OTHER PUBLICATIONS

Form PCT/ISA/210 (English language) filed in application PCT/CN2022/095682 (mailed Jul. 27, 2022).*
(Continued)

*Primary Examiner* — Mark Kopec
(74) *Attorney, Agent, or Firm* — Westbridge IP LLC

(57) ABSTRACT

The present disclosure discloses a preparation method and use of a high-performance modified lithium-nickel-manganese-cobalt oxide (LNMCO) nickel 55 material. In the preparation method of the present disclosure, a silica template-containing nano-precursor coated with a polymer is
(Continued)

10 μm prepared by electrospinning, and then the nano-precursor is sintered in the air to effectively provide effective embedding and attachment sites for subsequent nickel plating; and after the nickel plating, the silica template is removed such that distributed mesopores are generated in situ on the precursor. The mesopores provide channels for the subsequent penetration of molten lithium into the interior of the precursor material. A final prepared material has a better ion and electron conduction structure compared with traditional granular materials. The present disclosure also discloses a material prepared by the method. The present disclosure also discloses an LIB including the high-performance modified LNMCO nickel 55 material.

8 Claims, 1 Drawing Sheet

(51) Int. Cl.
| | |
|---|---|
| *H01M 4/505* | (2010.01) |
| *H01M 4/525* | (2010.01) |
| *H01M 4/62* | (2006.01) |
| *H01M 10/0525* | (2010.01) |

(52) U.S. Cl.
CPC ......... *H01M 4/625* (2013.01); *C01P 2002/50* (2013.01); *C01P 2004/03* (2013.01); *C01P 2006/40* (2013.01); *H01M 10/0525* (2013.01)

(56) References Cited

OTHER PUBLICATIONS

Form PCT/ISA/237 (English language) filed in application PCT/CN2022/095682 (mailed Jul. 27, 2022).*
Alcoutlabi et al "Preparation and properties of nanofiber-coated composite membranes as battery separators via electrospinning", J Mater Sci (2013) 48:2690-2700.*

* cited by examiner

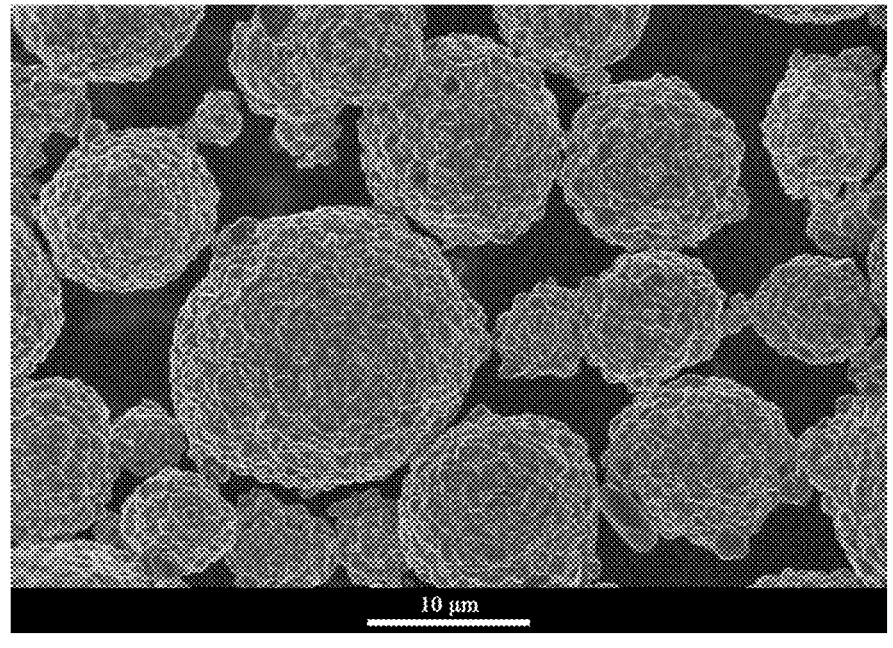
10 µm

PREPARATION METHOD AND USE OF HIGH-PERFORMANCE MODIFIED LITHIUM-NICKEL- MANGANESE-COBALT OXIDE (LNMCO) NICKEL 55 MATERIAL

CROSS-REFERENCE TO RELATED APPLICATIONS

The present application is a continuation application of PCT application No. PCT/CN2022/095682 filed on May 27, 2022, which claims the benefit of Chinese Patent Application No. 202110886828.1 filed on Aug. 3, 2021. The contents of all of the aforementioned applications are incorporated by reference herein in their entirety.

TECHNICAL FIELD

The present disclosure relates to the field of lithium-ion battery (LIB) materials, and in particular to a preparation method and use of a high-performance modified lithium-nickel-manganese-cobalt oxide (LNMCO) nickel 55 material.

BACKGROUND ART

Under the guidance of national policies, new energy vehicles, especially electric vehicles, have been widely promoted due to their advantages of energy conservation and environmental protection, and are expected to fully replace traditional fuel-engined vehicles before the end of this century. Batteries are the key to the development of electric vehicles, and among automotive power batteries, LIB is considered to be one of the most promising power batteries due to its advantages such as high safety, high specific capacity, and long charge-discharge cycle life. The selection of a cathode material is a key factor for the performance of LIB.

At present, commonly-used LIB cathode materials mainly include lithium-cobalt oxide (LCO), lithium-nickel oxide (LNO), lithium iron phosphate (LFP), etc. LNMCO is an improved ternary material with a single doped anion material, which has excellent electrochemical performance, stable discharge voltage plateau, wide working voltage, and high safety, and can effectively compensate for the shortcomings of LNO, lithium-manganese oxide (LMO), and LCO. However, in existing common preparation methods of LNMCO, such as solid-phase method or co-precipitation method, a precursor raw material powder is obtained mostly by ball-milling or grinding, so it is difficult to achieve sufficient mixing of various components, which results in low dispersibility and uniformity and also makes a prepared product have defects such as uneven particle size distribution, agglomeration, and low purity. Moreover, a preparation process is time-consuming and inefficient.

A preparation method of a doped and coated modified LNMCO nickel 55 material with high performance is disclosed in the related art, where a nickel-manganese-cobalt hydroxide (as a raw material) is pretreated and then subjected to chemical nickel plating (CNP) and element doping to obtain a precursor powder, then the precursor powder is mixed with molten lithium, and a resulting mixture is subjected to a high temperature reaction to obtain a final material. The obtained material has a coating with a nickel content gradient, which increases the life of the material; and molten lithium can go deep into the precursor and react, such that the material has equal internal and external lithium contents, which avoids uneven doping. However, this preparation method can only achieve the gradient nickel distribution of a CNP layer and a nickel-containing precursor powder. Since the powder inevitably faces agglomeration during nickel plating, an authentic gradient distribution from inside to outside cannot be achieved. As a precursor core itself has no mesoporous space, lithium cannot truly penetrate the interior of the precursor. In addition, the obtained material is a material with one-dimensional particle morphology, and the ion and electron conduction efficiency of such a material is low, which affects the electrochemical stability of a final product. There is still room for improvement in the performance of the material.

SUMMARY

Based on the defects in the prior art, an objective of the present disclosure is to provide a preparation method of a high-performance modified LNMCO nickel 55 material, where a mesoporous precursor is prepared by a template method in combination with electrospinning, then a precursor material without a template is prepared step by step through the combination of CNP and molten lithium, and finally an LNMCO material with a gradient nickel distribution from inside to outside is prepared.

In order to achieve the above objective, the present disclosure adopts the following technical solutions:

A preparation method of a high-performance modified LNMCO nickel 55 material is provided, including the following steps:

(1) dissolving a nickel source, a cobalt source, and a manganese source in a solvent, adding an acid, an organic carbon source, and colloidal silica, and thoroughly mixing a resulting mixture to obtain a precursor dispersion A, where the organic carbon source accounts for 12% to 16% of a total mass of the precursor dispersion; the colloidal silica accounts for 30% to 60% of the total mass of the precursor dispersion; nickel, cobalt, and manganese in the precursor dispersion A have a molar ratio of 55: x:(45−x), where x<45; and the nickel has a concentration of 1 mol/L to 1.2 mol/L in the precursor dispersion A;

(2) preparing a nanomembrane from the precursor dispersion A obtained in step (1) by electrospinning, and drying, heating, and incubating the nanomembrane to obtain a precursor B;

(3) adding the precursor B obtained in step (2) to a nickel-plating liquid, and conducting CNP; and subjecting a resulting plating product to density gradient centrifugation, and collecting and cleaning an upper solid layer to obtain a precursor C; where the nickel-plating liquid includes a nickel salt, a complexing agent, and a reducing agent, and the nickel salt has a mass concentration of 30 g/L to 50 g/L; and (4) soaking the precursor C obtained in step (3) in an alkali liquid for 24 h to 48 h, and washing and drying to obtain a mesoporous precursor D; heating the mesoporous precursor D to 600° C. to 700° C., and thoroughly mixing the mesoporous precursor D with molten lithium to react, where the molten lithium is at an identical temperature to that of the mesoporous precursor D; after reaction completion, heating a resulting product to 550° C. to 700° C. to react for 0.5 h to 1 h in an oxygen-containing protective atmosphere; and further reacting for 2 h to 5 h with oxygen introduction, and cooling to obtain the high-performance modified LNMCO nickel 55 material.

In the preparation method of a high-performance modified LNMCO nickel 55 material according to the present disclosure, a polymer-coated nano-precursor with nickel, cobalt and manganese sources and a silica template is prepared by electrospinning, and then the nano-precursor is sintered in the air (due to the in situ generation of silica, the overall structure is retained even after the polymer is removed, and void channels left after the polymer is burnt out effectively provide effective embedding and attachment sites for subsequent nickel plating, such that the CNP can be realized from outside to inside); and after a nickel plating layer is penetratively coated, the silica template is removed by an alkali liquid, such that distributed mesopores are generated in situ on the precursor. The mesopores provide channels for the subsequent penetration of molten lithium into the interior of the precursor material, such that a nickel content inside the material is close to or equal to that outside the material. A final prepared cathode material has a better ion and electron conduction structure compared with traditional granular materials. Moreover, the material has a large specific surface area (SSA), which can effectively reduce the polarization phenomenon of an electrode during an electrochemical reaction process, such that the material has high charge and discharge capacity and superior cycling stability and rate performance.

Preferably, in step (1), the solvent may be deionized water; the nickel source may include at least one from the group consisting of nickel acetate, nickel nitrate, and nickel carbonate; the cobalt source may include at least one from the group consisting of cobalt acetate, cobalt nitrate, and cobalt carbonate; the manganese source may include at least one from the group consisting of manganese acetate, manganese nitrate, and manganese carbonate; the acid may include at least one from the group consisting of hydrochloric acid and sulfuric acid; and the organic carbon source may include at least one from the group consisting of PVP and PVA.

Preferably, in step (2), the electrospinning may specifically include: injecting the precursor dispersion A as a spinning liquid into a syringe, connecting a needle of the syringe to an electrode, and turning on a power supply to prepare the nanomembrane with a drum receiver as a counter electrode; and a voltage of the power supply may be set to 12 kV to 18 kV, an advancing speed of the syringe may be set to 0.5 mL/min to 0.7 mL/min, and a rotational speed of the drum receiver may be set to 20 r/min to 30 r/min.

Since the precursor dispersion described in the present disclosure also includes colloidal silica, a viscosity is relatively high. If the advancing speed and voltage for the spinning are too high, spun fibers may be bent excessively and have poor uniformity, and part of the spinning liquid ejected out from the needle may fail to form a complete precursor (resulting in raw material waste), or the spinning liquid may become dry and clog the needle when dripping out (reducing production efficiency). If the advancing speed and voltage are too slow, the spinning will take too much time, and the dispersion may undergo precipitation in the syringe, which also causes the needle of the syringe to be clogged.

More preferably, in step (2), the nanomembrane may be prepared by electrospinning at a receiving distance of 20 cm to 30 cm and a temperature of 25° C. to 28° C.

At the receiving distance, fibers ejected from the needle can be uniformly collected on the drum receiver. The strict control of a reaction temperature at room temperature can prevent ejected liquid at the needle from becoming dry and clogging, and allows a precursor membrane on the receiver to be quickly dried and set.

Preferably, in step (2), the nanomembrane may be heated to 500° C. to 650° C. and then incubated for 2 h to 3 h.

Preferably, in the nickel-plating liquid in step (3), the nickel salt may include at least one from the group consisting of nickel sulfate, nickel acetate, and nickel carbonate, the complexing agent may be EDTA, and the reducing agent may be hydrazine hydrate; and the complexing agent may have a mass concentration of 15 g/L to 45 g/L and the reducing agent may have a volume concentration of 60 mL/L to 80 mL/L.

More preferably, a pH of the nickel-plating liquid may be adjusted to 11 to 13 with a pH adjusting agent before use.

Preferably, for the CNP in step (3), a solid-to-liquid ratio of the precursor B to the nickel-plating liquid may be 1 g:(0.8-1.6) mL; and the CNP may be conducted for 15 min to 20 min at 80° C. to 85° C.

More preferably, the density gradient centrifugation in step (3) may be conducted with reference to a corresponding step in CN109860590B.

Preferably, in step (4), the soaking of the precursor C in the alkali liquid may be conducted at 60° C. to 90° C., the alkali liquid may include a sodium hydroxide solution, and hydroxide ions in the alkali liquid may have a molar concentration of 1 mol/L to 2 mol/L.

More preferably, in step (4), the alkali liquid may be a sodium hydroxide solution, and the precursor C may be soaked in the alkali liquid for 48 h; and the sodium hydroxide solution may have a concentration of 1 mol/L.

Since silica in the precursor C is mixed with a nickel plating layer and a precursor material, the long-time soaking with a low-concentration alkali liquid can retain the complete structure of a material as much as possible, and prevent a material structure from being damaged due to the rapid dissolution of the silica template.

Preferably, in step (4), a solid-to-liquid ratio of the mesoporous precursor D to the molten lithium may be 1 g:(0.5-1) mL, and after the mesoporous precursor D and the molten lithium are thoroughly mixed, they may be allowed to react for 3 h to 5 h.

Because the lithium of the present disclosure has a low melting point, molten lithium is mixed with a mesoporous precursor to prepare a solid solution, which can effectively improve the flow and migration efficiency of lithium and allows lithium to migrate into the interior of a material. Therefore, after a constant-temperature reaction is conducted for sufficient time, a material can be ensured to have a uniform composite structure. If a mixing temperature is too low, the lithium cannot be melted; and if the mixing temperature is too high, the overall structure of a material may be destroyed during the preparation of a solid solution.

Preferably, in the oxygen-containing protective atmosphere in step (4), a protective gas may be nitrogen or argon, and oxygen may have a concentration of 2 ppm to 20 ppm in the protective atmosphere.

Another objective of the present disclosure is to provide a high-performance modified LNMCO nickel 55 material prepared by the preparation method of a high-performance modified LNMCO nickel 55 material described above.

The high-performance modified LNMCO nickel 55 material of the present disclosure is a material structure with large SSA, prominent electrolyte wettability, and high ion and conductivity mobility. Moreover, there is a gradient nickel distribution from inside to outside of the material, with a uniform overall distribution, so the material can exhibit excellent electrochemical performance when used in LIB cathode materials.

Another objective of the present disclosure is to provide an LIB, and a cathode material of the LIB includes the high-performance modified LNMCO nickel 55 material of the present disclosure.

Beneficial effects of the present disclosure: The present disclosure provides a preparation method of a high-performance modified LNMCO nickel 55 material. In the preparation method, a silica template-containing nano-precursor coated with a polymer is prepared by electrospinning, and then the nano-precursor is sintered in the air (void channels left after the polymer is burnt out effectively provide effective embedding and attachment sites for subsequent nickel plating); and after the nickel plating, the silica template is removed such that distributed mesopores are generated in situ on the precursor. The mesopores provide channels for the subsequent penetration of molten lithium into the interior of the precursor material, such that a nickel content inside the material is close to or equal to that outside the material. A final prepared cathode material has a better ion and electron conduction structure compared with traditional granular materials. The present disclosure also provides a high-performance modified LNMCO nickel 55 material prepared by the method. The material has a uniform dispersion morphology and a large SSA, which can effectively reduce the polarization phenomenon of an electrode during an electrochemical reaction process, such that the material has high charge and discharge capacity and superior cycling stability and rate performance. The present disclosure also provides an LIB including the high-performance modified LNMCO nickel 55 material.

BRIEF DESCRIPTION OF DRAWINGS

The sole FIGURE is a scanning electron microscopy (SEM) image of the high-performance modified LNMCO nickel 55 obtained in Example 1 of the present disclosure.

DETAILED DESCRIPTION

In order to well illustrate the objectives, technical solutions, and advantages of the present disclosure, the present disclosure will be further described below in conjunction with specific examples and comparative examples, which is intended to comprehend the content of the present disclosure in detail, rather than limit the present disclosure. All other examples obtained by those of ordinary skill in the art without creative efforts shall fall within the protection scope of the present disclosure. Unless otherwise specified, the experimental reagents and instruments designed for the implementation of the present disclosure are commonly-used reagents and instruments.

Example 1

An example of the preparation method of a high-performance modified LNMCO nickel 55 material according to the present disclosure was provided, including the following steps:

(1) nickel acetate, cobalt acetate, and manganese acetate were dissolved in deionized water, then hydrochloric acid, PVP, and colloidal silica were added, and a resulting mixture was thoroughly mixed to obtain a precursor dispersion A, where the PVP accounted for 15% of a total mass of the precursor dispersion; the colloidal silica accounted for 40% of the total mass of the precursor dispersion; nickel, cobalt, and manganese in the precursor dispersion A had a molar ratio of 55:20:25; and the nickel had a concentration of 1.2 mol/L in the precursor dispersion A;

(2) a nanomembrane was prepared from the precursor dispersion A obtained in step (1) by electrospinning, vacuum-dried, and heated to 600° C. and incubated for 2 h in an air atmosphere to obtain a precursor B; where the electrospinning was conducted specifically as follows: the precursor dispersion A was injected as a spinning liquid into a syringe at a set temperature of 25° C., a needle of the syringe was connected to an electrode, and a power supply was turned on to prepare the nanomembrane with a drum receiver as a counter electrode; and a voltage of the power supply was set to 16 kV, an advancing speed of the syringe was set to 0.5 mL/min, a rotational speed of the drum receiver was set to 30 r/min, and a receiving distance of the electrospinning was set to 25 cm;

(3) the precursor B obtained in step (2) was added to a nickel-plating liquid at a solid-to-liquid ratio of 1 g: 1.2 mL, a pH of the nickel-plating liquid was adjusted to 12, and then the nickel-plating liquid was heated to 85° C. to conduct CNP for 20 min; and a resulting plating product was subjected to density gradient centrifugation, and an upper solid layer was collected and cleaned to obtain a precursor C; where the nickel-plating liquid included a nickel salt, a complexing agent, and a reducing agent; the nickel salt was nickel sulfate with a mass concentration of 60 g/L; the complexing agent was EDTA with a mass concentration of 40 g/L; and the reducing agent was hydrazine hydrate with a volume concentration of 70 mL/L; and (4) the precursor C obtained in step (3) was soaked in a 1 mol/L sodium hydroxide solution for 48 h at 80° C., and then washed and dried to obtain a mesoporous precursor D; the mesoporous precursor D was heated to 650° C. and then thoroughly mixed with molten lithium in a solid-to-liquid ratio of 1 g: 0.8 mL to react for 4 h, where the molten lithium was at an identical temperature to that of the mesoporous precursor D; after reaction completion, a resulting product was heated to 700° C. to react for 1 h in an oxygen-containing (10 ppm) protective atmosphere; reaction was further conducted for 3 h with oxygen introduction, and a resulting product was cooled to obtain the high-performance modified LNMCO nickel 55 material; and the material was observed under a scanning electron microscope, as shown in the sole FIGURE.

Example 2

An example of the preparation method of a high-performance modified LNMCO nickel 55 material according to the present disclosure was provided, including the following steps:

(1) nickel acetate, cobalt acetate, and manganese acetate were dissolved in deionized water, then hydrochloric acid, PVP, and colloidal silica were added, and a resulting mixture was thoroughly mixed to obtain a precursor dispersion A, where the PVP accounted for 16% of a total mass of the precursor dispersion; the colloidal silica accounted for 60% of the total mass of the precursor dispersion; nickel, cobalt, and manganese in the precursor dispersion A had a molar ratio of 55:15:30; and the nickel had a concentration of 1 mol/L in the precursor dispersion A;

(2) a nanomembrane was prepared from the precursor dispersion A obtained in step (1) by electrospinning, vacuum-dried, and heated to 500° C. and incubated for 3 h in an air atmosphere to obtain a precursor B; where the electrospinning was conducted specifically as follows: the precursor dispersion A was injected as a spinning liquid into a syringe at a set temperature of 28° C., a needle of the syringe was connected to an electrode, and a power supply was turned on to prepare the nanomembrane with a drum receiver as a counter electrode; and a voltage of the power supply was set to 13 kV, an advancing speed of the syringe was set to 0.7 mL/min, a rotational speed of the drum receiver was set to 25 r/min, and a receiving distance of the electrospinning was set to 25 cm;

(3) the precursor B obtained in step (2) was added to a nickel-plating liquid at a solid-to-liquid ratio of 1 g:1.5 mL, a pH of the nickel-plating liquid was adjusted to 12, and then the nickel-plating liquid was heated to 85° C. to conduct CNP for 10 min; and a resulting plating product was subjected to density gradient centrifugation, and an upper solid layer was collected and cleaned to obtain a precursor C; where the nickel-plating liquid included a nickel salt, a complexing agent, and a reducing agent; the nickel salt was nickel sulfate with a mass concentration of 50 g/L; the complexing agent was EDTA with a mass concentration of 45 g/L; and the reducing agent was hydrazine hydrate with a volume concentration of 80 mL/L; and (4) the precursor C obtained in step (3) was soaked in a 2 mol/L sodium hydroxide solution for 24 h at 70° C., and then washed and dried to obtain a mesoporous precursor D; the mesoporous precursor D was heated to 700° C. and then thoroughly mixed with molten lithium in a solid-to-liquid ratio of 1 g: 1 mL to react for 5 h, where the molten lithium was at an identical temperature to that of the mesoporous precursor D; after reaction completion, a resulting product was heated to 650° C. to react for 1 h in an oxygen-containing (20 ppm) protective atmosphere; and reaction was further conducted for 4 h with oxygen introduction, and a resulting product was cooled to obtain the high-performance modified LNMCO nickel 55 material.

Example 3

An example of the preparation method of a high-performance modified LNMCO nickel 55 material according to the present disclosure was provided, including the following steps:

(1) nickel carbonate, cobalt carbonate, and manganese carbonate were dissolved in deionized water, then hydrochloric acid, PVP, and colloidal silica were added, and a resulting mixture was thoroughly mixed to obtain a precursor dispersion A, where the PVP accounted for 12% of a total mass of the precursor dispersion; the colloidal silica accounted for 60% of the total mass of the precursor dispersion; nickel, cobalt, and manganese in the precursor dispersion A had a molar ratio of 55:10:35; and the nickel had a concentration of 1 mol/L in the precursor dispersion A;

(2) a nanomembrane was prepared from the precursor dispersion A obtained in step (1) by electrospinning, vacuum-dried, and heated to 650° C. and incubated for 2 h in an air atmosphere to obtain a precursor B; where the electrospinning was conducted specifically as follows: the precursor dispersion A was injected as a spinning liquid into a syringe at a set temperature of 25° C., a needle of the syringe was connected to an electrode, and a power supply was turned on to prepare the nanomembrane with a drum receiver as a counter electrode; and a voltage of the power supply was set to 15 kV, an advancing speed of the syringe was set to 0.6 mL/min, a rotational speed of the drum receiver was set to 30 r/min, and a receiving distance of the electrospinning was set to 25 cm;

(3) the precursor B obtained in step (2) was added to a nickel-plating liquid at a solid-to-liquid ratio of 1 g: 1.6 mL, a pH of the nickel-plating liquid was adjusted to 12, and then the nickel-plating liquid was heated to 85° C. to conduct CNP for 18 min; and a resulting plating product was subjected to density gradient centrifugation, and an upper solid layer was collected and cleaned to obtain a precursor C; where the nickel-plating liquid included a nickel salt, a complexing agent, and a reducing agent; the nickel salt was nickel sulfate with a mass concentration of 50 g/L; the complexing agent was EDTA with a mass concentration of 20 g/L; and the reducing agent was hydrazine hydrate with a volume concentration of 60 mL/L; and (4) the precursor C obtained in step (3) was soaked in a 2 mol/L sodium hydroxide solution for 48 h at 80° C., and then washed and dried to obtain a mesoporous precursor D; the mesoporous precursor D was heated to 650° C. and then thoroughly mixed with molten lithium in a solid-to-liquid ratio of 1 g: 1 mL to react for 5 h, where the molten lithium was at an identical temperature to that of the mesoporous precursor D; after reaction completion, a resulting product was heated to 700° C. to react for 1 h in an oxygen-containing (10 ppm) protective atmosphere; and reaction was further conducted for 3 h with oxygen introduction, and a resulting product was cooled to obtain the high-performance modified LNMCO nickel 55 material.

Comparative Example 1

A comparative example of the preparation method of a high-performance modified LNMCO nickel 55 material according to the present disclosure was provided, including the following steps:

(1) nickel acetate, cobalt acetate, and manganese acetate were dissolved in deionized water, then hydrochloric acid, PVP, and colloidal silica were added, and a resulting mixture was thoroughly mixed to obtain a precursor dispersion A, where the PVP accounted for 15% of a total mass of the precursor dispersion; the colloidal silica accounted for 40% of the total mass of the precursor dispersion; nickel, cobalt, and manganese in the precursor dispersion A had a molar ratio of 55:20:25; and the nickel had a concentration of 1.2 mol/L in the precursor dispersion A;

(2) a nanomembrane was prepared from the precursor dispersion A obtained in step (1) by electrospinning, vacuum-dried, and heated to 600° C. and incubated for 2 h in an air atmosphere to obtain a precursor B; where the electrospinning was conducted specifically as follows: the precursor dispersion A was injected as a spinning liquid into a syringe at a set temperature of 25° C., a needle of the syringe was connected to an electrode, and a power supply was turned on to prepare the nanomembrane with a drum receiver as a counter electrode; and a voltage of the power supply was set to 16 kV, an advancing speed of the syringe was set to 0.5 mL/min, a rotational speed of the drum receiver was set to 30 r/min, and a receiving distance of the electrospinning was set to 25 cm;

(3) the precursor B obtained in step (2) was soaked in a 2 mol/L sodium hydroxide solution for 28 h at 80° C., then washed and dried, and added to a nickel-plating liquid at a solid-to-liquid ratio of 1 g: 1 mL; a pH of the nickel-plating liquid was adjusted to 12, and then the nickel-plating liquid was heated to 85° C. to conduct CNP for 20 min; and a resulting plating product was subjected to density gradient centrifugation, and an upper solid layer was collected and cleaned to obtain a precursor C; where the nickel-plating liquid included a nickel salt, a complexing agent, and a reducing agent; the nickel salt was nickel sulfate with a mass concentration of 60 g/L; the complexing agent was EDTA with a mass concentration of 30 g/L; and the reducing agent was hydrazine hydrate with a volume concentration of 70 mL/L; and (4) the precursor C obtained in step (3) was heated to 650° C. and then thoroughly mixed with molten lithium in a solid-to-liquid ratio of 1 g: 1 mL to react for 6 h, where the molten lithium was at an identical temperature to that of the mesoporous precursor D; after reaction completion, a resulting product was heated to 700° C. to react for 1 h in an oxygen-containing (10 ppm) protective atmosphere; and reaction was further conducted for 3 h with oxygen introduction, and a resulting product was cooled to obtain the high-performance modified LNMCO nickel 55 material.

Comparative Example 2

This comparative example was different from Example 1 only in that, in step (2), the precursor dispersion A was subjected to ultrasonic dispersion, then heated in an 80° C. water bath under stirring until the dispersion was viscous, vacuum-dried, and heated and incubated in an air atmosphere to obtain a block precursor B; and the block precursor was crushed into a powder and then added to a nickel-plating liquid for CNP.

Comparative Example 3

This comparative example was different from Example 1 only in that, in step (1), the organic carbon source accounted for 5% of a total mass of the precursor dispersion; and the colloidal silica accounted for 70% of the total mass of the precursor dispersion.

Comparative Example 4

This comparative example was different from Example 1 only in that, in step (1), the organic carbon source accounted for 20% of a total mass of the precursor dispersion; and the colloidal silica accounted for 20% of the total mass of the precursor dispersion.

Comparative Example 5

This comparative example was different from Example 1 only in that, in step (4), the mesoporous precursor D was heated to 800° C. and then mixed with molten lithium to react, where the molten lithium was at an identical temperature to that of the mesoporous precursor D.

Comparative Example 6

1,000 g of a nickel-manganese-cobalt hydroxide (nickel, cobalt, and manganese had the same ratio as in Example 1) was added to 442 g of lithium carbonate, and a resulting mixture was subjected to ball-milling for 5 h and then sintered in the air at 800° C. for 8 h to obtain an LNMCO material, which was a solid-phase method.

Effect Example 1

Each of the products obtained in Examples 1 to 3 and Comparative Examples 1 to 6 was used as a positive electrode and lithium was used as a negative electrode to assemble a lithium-ion half-cell. The initial charge and discharge test was conducted at a rate of 1 C and a voltage range of 2.9 V to 4.3 V, then 2,000 charge-discharge cycles were conducted at a rate of 0.5 C, and test results were shown in Table 1.

TABLE 1

| Item | Initial specific discharge capacity (mAh/g) | Specific discharge capacity after 1,000 charge-discharge cycles (mAh/g) | Specific discharge capacity after 2,000 charge-discharge cycles (mAh/g) | Capacity retention after many cycles (%) |
|---|---|---|---|---|
| Example 1 | 175 | 171 | 158 | 91.86 |
| Example 2 | 173 | 170 | 149 | 87.64 |
| Example 3 | 176 | 169 | 146 | 84.39 |
| Comparative Example 1 | 173 | 160 | 132 | 77.19 |
| Comparative Example 2 | 168 | 146 | 121 | 73.33 |
| Comparative Example 3 | 165 | 153 | 127 | 77.91 |
| Comparative Example 4 | 167 | 155 | 126 | 75.44 |
| Comparative Example 5 | 174 | 162 | 133 | 77.32 |
| Comparative Example 6 | 162 | 143 | 112 | 69.14 |

It can be seen from Table 1 that, compared to the products obtained in Comparative Examples 1 to 5 beyond the preferred range and the product prepared by the solid-phase method commonly used in the prior art, the products obtained in Examples 1 to 3 have higher specific discharge capacity and cycling stability due to the uniform dispersion morphology and large SSA; and the product obtained in Example 1 still has a capacity retention of 91.86% after 2,000 cycles.

Finally, it should be noted that the above examples are provided merely to describe the technical solutions of the present disclosure, rather than to limit the protection scope of the present disclosure. Although the present disclosure is described in detail with reference to preferred examples, a person of ordinary skill in the art should understand that modifications or equivalent replacements may be made to the technical solutions of the present disclosure without departing from the spirit and scope of the technical solutions of the present disclosure.

The invention claimed is:

1. A preparation method of a high-performance modified lithium-nickel-manganese-cobalt oxide (LNMCO) nickel 55 material, comprising the following steps:

(1) dissolving a nickel source, a cobalt source, and a manganese source in a solvent, adding an acid, an organic carbon source, and colloidal silica, and thoroughly mixing a resulting mixture to obtain a precursor dispersion A, wherein the organic carbon source accounts for 12% to 16% of a total mass of the precursor dispersion; the colloidal silica accounts for 30% to 60% of the total mass of the precursor dispersion; nickel, cobalt, and manganese in the precursor dispersion A have a molar ratio of 55: x: (45-x), wherein x<45; and the nickel has a concentration of 1 mol/L to 1.2 mol/L in the precursor dispersion A;

(2) preparing a nanomembrane from the precursor dispersion A obtained in step (1) by electrospinning, and drying, heating, and incubating the nanomembrane to obtain a precursor B;

(3) adding the precursor B obtained in step (2) to a nickel-plating liquid, and conducting chemical nickel plating (CNP); subjecting a resulting plating product to density gradient centrifugation, and collecting and cleaning an upper solid layer to obtain a precursor C; wherein the nickel-plating liquid comprises a nickel salt, a complexing agent, and a reducing agent, and the nickel salt has a mass concentration of 30 g/L to 50 g/L; and (4) soaking the precursor C obtained in step (3) in an alkali liquid for 24 h to 48 h, and washing and drying to obtain a mesoporous precursor D; heating the mesoporous precursor D to 600° C. to 700° C., and thoroughly mixing the mesoporous precursor D with molten lithium to react, wherein the molten lithium is at an identical temperature to that of the mesoporous precursor D; after reaction completion, heating a resulting product to 550°° C. to 700° C. to react for 0.5 h to 1 h in an oxygen-containing protective atmosphere; and further reacting for 2 h to 5 h with oxygen introduction, cooling to obtain the high-performance modified LNMCO nickel 55 material.

2. The preparation method according to claim 1, wherein in step (1), the solvent is deionized water; the nickel source comprises at least one from the group consisting of nickel acetate, nickel nitrate, and nickel carbonate; the cobalt source comprises at least one from the group consisting of cobalt acetate, cobalt nitrate, and cobalt carbonate; the manganese source comprises at least one from the group consisting of manganese acetate, manganese nitrate, and manganese carbonate; the acid comprises at least one from the group consisting of hydrochloric acid and sulfuric acid; and the organic carbon source comprises at least one from the group consisting of PVP and PVA.

3. The preparation method according to claim 1, wherein in step (2), the electrospinning comprises injecting the precursor dispersion A as a spinning liquid into a syringe, connecting a needle of the syringe to an electrode, and turning on a power supply to prepare the nanomembrane with a drum receiver as a counter electrode; a voltage of the power supply is set to 12 kV to 18 kV, an advancing speed of the syringe is set to 0.5 mL/min to 0.7 mL/min, and a rotational speed of the drum receiver is set to 20 r/min to 30 r/min; a receiving distance of the electrospinning is 20 cm to 30 cm and a temperature of the electrospinning of 25° C. to 28° C.

4. The preparation method according to claim 1, wherein in step (2), the nanomembrane is heated to 500° C. to 650° C. and then incubated for 2 h to 3 h.

5. The preparation method according to claim 1, wherein in the nickel-plating liquid in step (3), the nickel salt comprises at least one from the group consisting of nickel sulfate, nickel acetate, and nickel carbonate, the complexing agent is EDTA, and the reducing agent is hydrazine hydrate; the complexing agent has a mass concentration of 15 g/L to 45 g/L and the reducing agent has a volume concentration of 60 mL/L to 80 mL/L; and a pH of the nickel-plating liquid is adjusted to 11 to 13 with a pH adjusting agent before use.

6. The preparation method according to claim 1, wherein for the CNP in step (3), a solid-to-liquid ratio of the precursor B to the nickel-plating liquid is 1: (0.8-1.6); and the CNP is conducted for 15 min to 20 min at 80° C. to 85° C.

7. The preparation method according to claim 1, wherein in step (4), the soaking of the precursor C in the alkali liquid is conducted at 60° C. to 90° C., and hydroxide ions in the alkali liquid have a molar concentration of 1 mol/L to 2 mol/L; in step (4), the alkali liquid is a sodium hydroxide solution, and the precursor C is soaked in the alkali liquid for 48 h; and the sodium hydroxide solution has a concentration of 1 mol/L.

8. The preparation method according to claim 1, wherein in step (4), a solid-to-liquid ratio of the mesoporous precursor D to the molten lithium is 1 g:(0.5-1) mL, and after the mesoporous precursor D and the molten lithium are thoroughly mixed, they are allowed to react for 3 h to 5 h.

* * * * *